March 6, 1962   D. V. GILLILAND   3,023,568
OPTIMUM AUTOMATIC TRANSMISSION AND CONTROL MEANS
Filed May 24, 1957   4 Sheets-Sheet 1

INVENTOR.
DARRELL V. GILLILAND
BY R. W. Hodgson

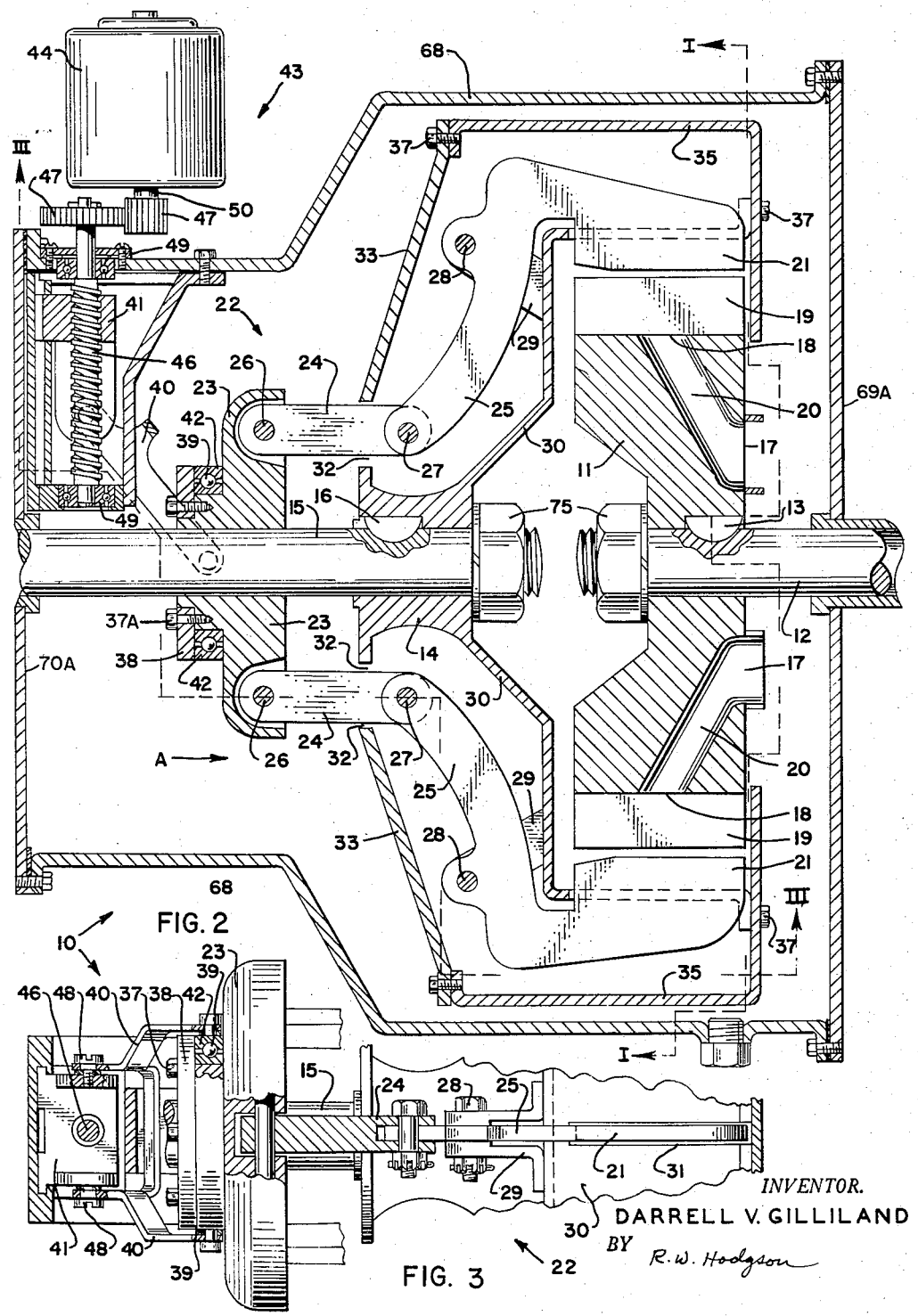

March 6, 1962        D. V. GILLILAND        3,023,568

OPTIMUM AUTOMATIC TRANSMISSION AND CONTROL MEANS

Filed May 24, 1957        4 Sheets-Sheet 4

INVENTOR.
DARRELL V. GILLILAND
BY R. W. Hodgson

United States Patent Office 3,023,568
Patented Mar. 6, 1962

3,023,568
OPTIMUM AUTOMATIC TRANSMISSION AND
CONTROL MEANS
Darrell V. Gilliland, Reno, Nev.
Filed May 24, 1957, Ser. No. 661,429
5 Claims. (Cl. 60—12)

Generally speaking, the present invention relates to the automatic transmission art and, more particularly, relates to the combination of pressure sensitive control means, coupled to a variable pressure chamber associated with engine loading requirements, and an automatic transmission, coupled with respect to said pressure sensitive control means, for optimum control of torque and speed ratio in response to engine loading requirements.

Applicant is aware of the fact that prior art automatic transmissions and control means have been developed heretofore and believes that such prior art arrangements are disadvantageous for various reasons. Most of the prior art automatic transmissions are pre-set to shift at certain predetermined speeds which have been determined by the factory. These settings are not linked in any manner to the actual engine loading requirements of the automobile, and as a result there is a great deal of inefficient performance in the prior art automatic transmissions. Actual speed and torque requirements under normal driving conditions change very rapidly and a great deal of power, gas mileage, and unnecessary wear and tear on the motor is caused by the failure of the prior art automatic transmissions to provide optimum torque and speed ratio in response to actual engine loading requirements.

The present invention was developed primarily to overcome the aforementioned prior art problems and, generally speaking, can be said to be an automatic transmission cooperable for optimum control of torque and speed ratio in response to engine loading requirements. It consists of a driving rotary assembly provided with fluid conduit means including intake openings and discharge openings, and driving vanes. The driving rotary assembly is attached with respect to an input shaft, which is rotated by the engine of an automobile. Attached with respect to an output shaft, which is adapted to rotate the wheels of an automobile, is a driven assembly which is provided with driven vanes and toggle means, and with said toggle means being cooperable for radial adjustment of the driven vanes.

Pressure sensitive control means including pneumatic actuator means and reversible motor control means is normally connected with respect to the intake manifold of an automobile, although not so limited. The reversible motor control means is electrically connected to separate directional windings of a reversible motor. The reversible motor is mechanically coupled with respect to the toggle means whereby the reversible motor controls the rotary and axially slidable collar means which in turn controls the driven vanes of the driven assembly. Thus, the automatic transmission is controlled for optimum torque and speed requirements by the pressure sensitive control means which is coupled to the intake manifold having an interior pressure correlated with engine loading requirements.

From the above description of basic and generic forms of the present invention, it will be apparent to those skilled in the art that virtually all of the hereinbefore mentioned prior art problems and/or disadvantages are substantially entirely eliminated, met and/or overcome in and through use of the present automatic transmission.

The primary object of the present invention is to provide an improved automatic transmission and control device which is responsive to engine loading requirements for automatically adjusting the torque and speed requirements in a manner which is extremely efficient.

Another object of the present invention is to provide pressure sensitive control means which is cooperable for coupling to a variable pressure chamber having an interior pressure correlated with engine loading requirements and which is cooperable for coupling with respect to an automatic transmission to provide optimum torque and speed.

A further object of the present invention is to provide, in an automatic transmission, toggle means for radially adjusting the driven vanes of the driven assembly.

Yet another object of the present invention is to provide reversible motor means which may be coupled with respect to pressure sensitive control means for actuating the toggle means in response to the pressure within the variable pressure chamber whereby the driven vanes may be radially adjusted.

It is a further object of the present invention to provide a device of the character set forth in the preceding objects, which is easily manufactured and assembled, easy to install and of virtually foolproof construction.

Other and allied objects will be apparent to those skilled in the art after a careful perusal, examination and study of the accompanying illustrations, the present specification, and the appended claims.

To facilitate understanding, reference will be made to the hereinbelow described figures, in which:

FIG. 2 is a fragmentary view partly in vertical section along the longitudinal axis of the automatic transmission (but with the driving and driven rotors and vanes being taken as indicated by the arrows II—II in FIG. 1 and being shown in the high speed position) and including the reversible motor means (shown in elevation);

FIG. 3 is a fragmentary sectional view taken along the lines III—III in FIG. 2;

Figure 4:
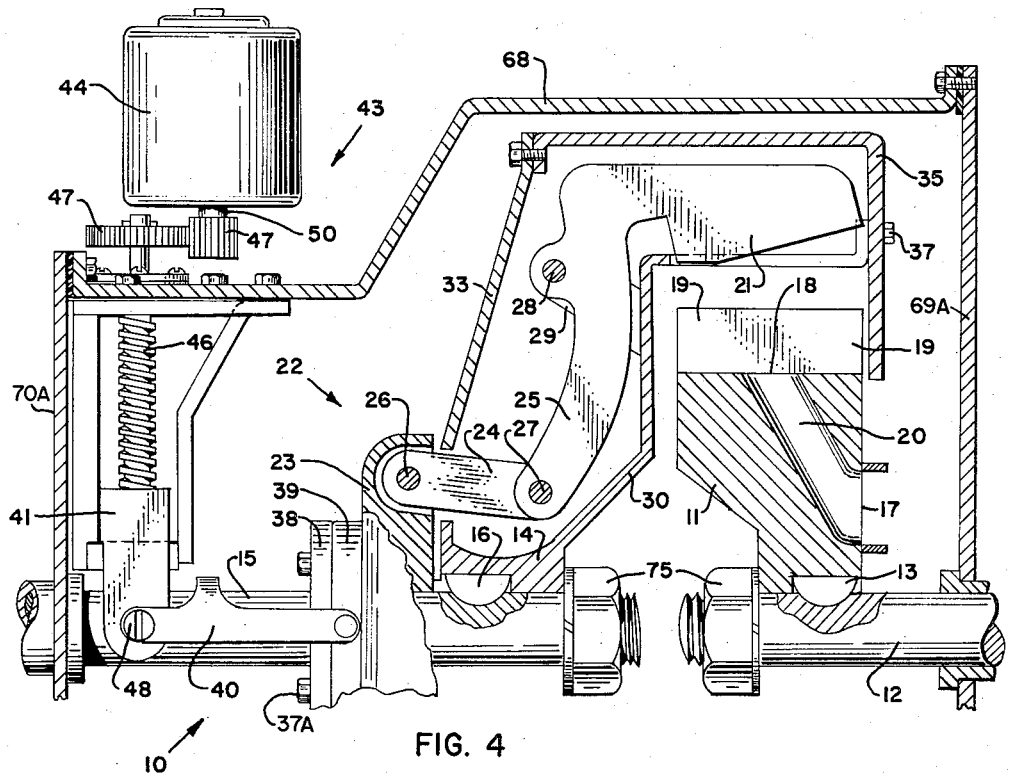
FIG. 4 is a fragmentary partly sectional view, similar to the view shown in FIG. 2, but showing the toggle means and the driven vanes in a non-operative position prior to firing of the engine, and with the reversible motor means and portions of the toggle means shown in elevation.
Figure 5:
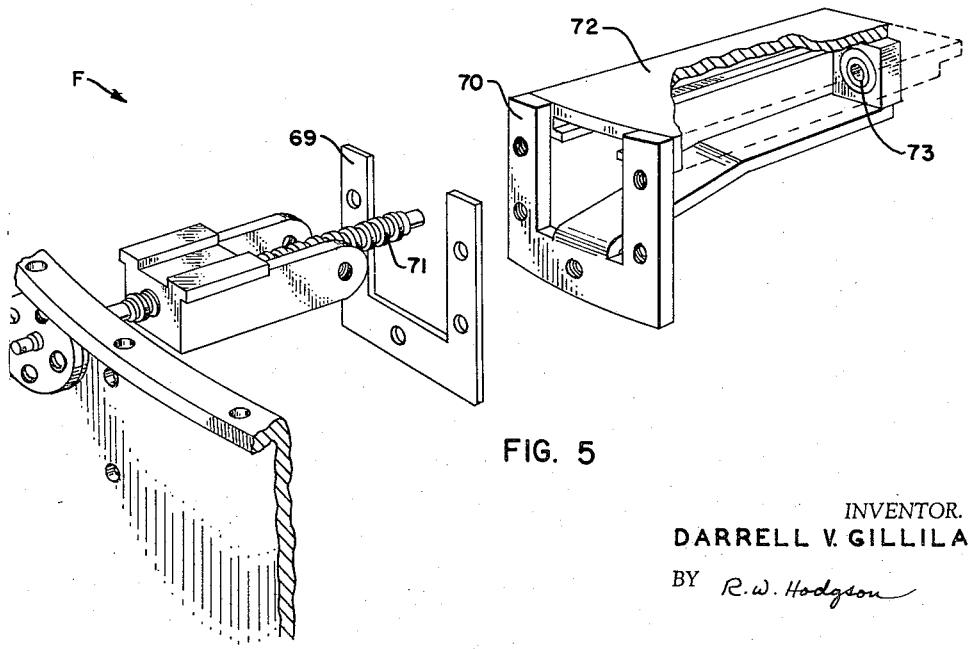
FIG. 5 is an exploded fragmentary perspective view of an automobile chassis showing the region wherein the automatic transmission of the present invention is mounted.

Generally speaking, the automatic transmission, indicated generally at 10 in FIGS. 1-4, of the present invention is cooperable to be mounted with respect to the automobile frame, indicated generally at F in FIG. 5.

Figure 1:
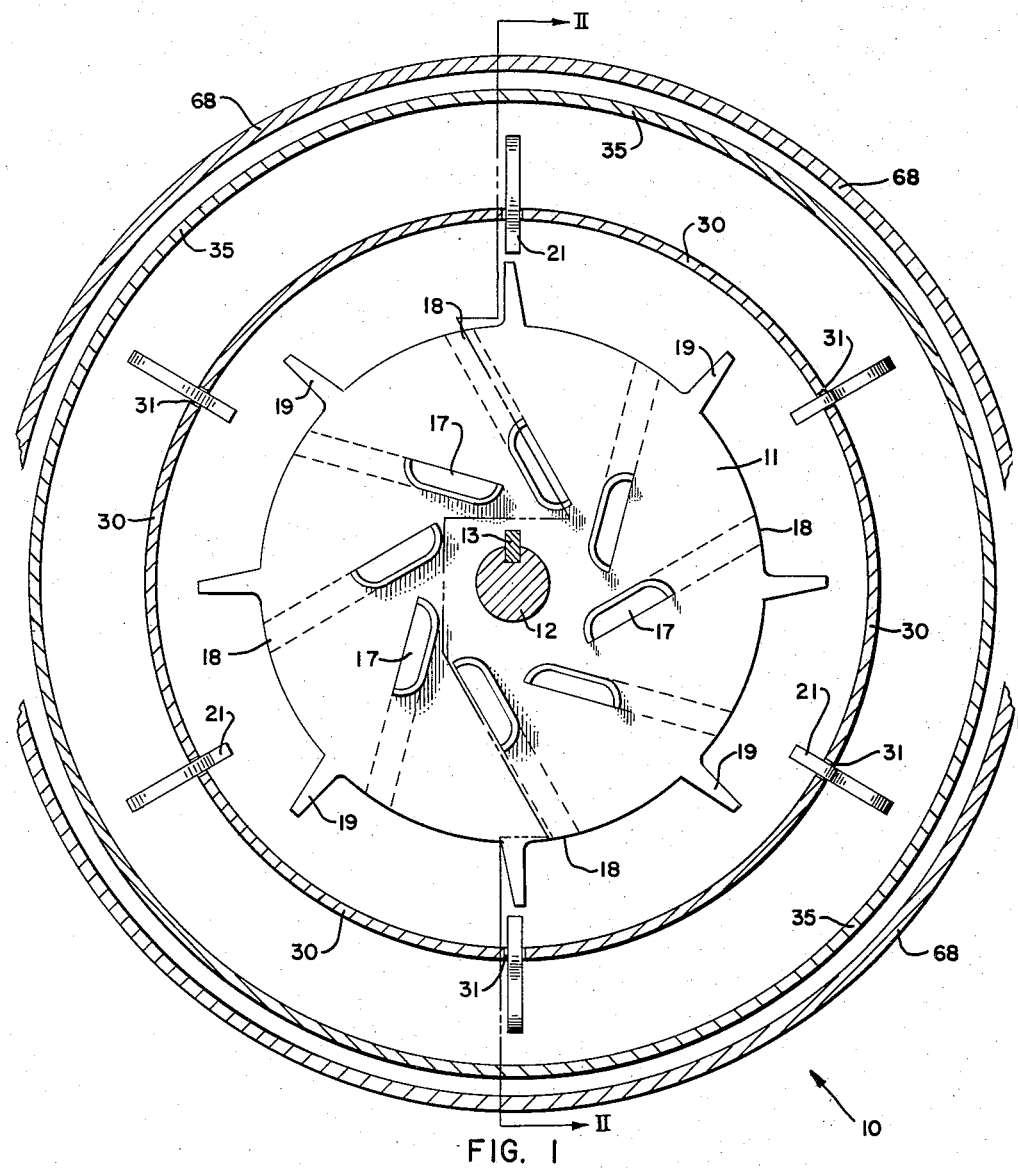
FIG. 1 is a front elevational view of the automatic transmission taken along the lines I—I in FIG. 2, showing the face of the driving rotary assembly.
Figure 10:
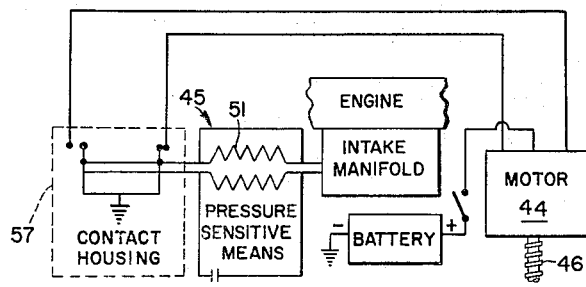
FIG. 10 is a schematic, diagrammatic showing of the entire system illustrating the interrelationship of the elements thereof.

The transmission 10 consists of a driving rotary assembly 11, which is attached to the input shaft 12 from the engine by the key 13, and the driven rotary assembly 14, which is attached to the output shaft 15 by the key 16, as best shown in FIGS. 1, 2, and 4.

The driving rotary assembly 11 is provided with fluid conduit means 20 including intake openings 17 and discharge openings 18, and a plurality of driving vanes 19 whereby the oil is sucked into the intake openings 17 by centrifugal force created by the input shaft 12 and thence through the passage 20 and out the discharge openings 18 whereupon the driving vanes 19 impel the oil (not shown for reasons of clarity) against the driven vanes 21 of the driven rotary assembly 14. The vanes 19, the passages 20, and the openings 17 and 18 are radially disposed around the shaft 12. The nuts 75 secure the rotary assembly 11 and 14 to the shafts 12 and 15 respectively.

The driven rotary assembly 14 has toggle means, indicated generally at 22 in FIGS. 2–4, which are cooperable for radially adjusting the driven vanes 21 upon actuation.

The toggle means 22 consists of a rotary and axially slidable collar 23 and linkage elements 24 and 25 which are attached with respect to the collar 23. The linkage members 24 are pivotally mounted to the collar 23 at 26 and to the linkage members 25 at the pivotal point 27, and with the linkage members 25 being integral with the driven vanes 21 and being pivotally mounted at 28 to the flanged member 29 which abuts the separator plate 30, as best shown in FIGS. 2–4. The linkage members 24 communicate through the apertures 32 of the vane housing 33 and are pivotally connected with the linkage members 25.

The vane housing 33, in the particular example illustrated in FIGS. 2 and 4, has a portion which is integral with the assembly 14 and a circumferential plate 35 that is attached to the separator plate 30 by the fasteners 37.

The separator plate 30, which is remotely opposed to the driving assembly 11, is provided with longitudinal vane slots 31 wherein the driven vanes 21 are positioned for radial adjustment therein, as best shown in FIGS. 1 and 3.

Thus the actuation of the collar 23, in the direction indicated by the arrow A in FIG. 2, will cause the driven vanes 21 to radially move away from the shaft 12 thereby providing the automatic transmission 10 with increasing torque, and conversely for the opposite direction, as indicated by the relative positioning of the vanes 21 in FIGS. 2 and 4.

The plate 38, attached by the fasteners 37A to the collar 23, maintains a circumferential ball bearing ring 39 with respect to the collar 23, and with the ring 39 being freely rotatable on the collar 23. A yoke 40 is pivotally attached to the bearing ring 39 and to the follower 41 for limited pivotal movement between two extreme positions. The outer portion 42 of the ball bearing ring 39 is non-rotatable because of the constraining action of the yoke 40 whereby the collar 23 is free to rotate with respect to the yoke 40. The yoke 40 remains non-rotatable during the rotary movement of the collar 23 and is cooperable for relative longitudinal movement only.

Slidable axial movement of the collar 23, which results in corresponding radial adjustment of the vanes 21, is actuated by the reversible motor means, indicated generally at 43 in FIGS. 2 and 4.

The reversible motor means 43 comprises a reversible motor 44, coupled with respect to the pressure sensitive means 45, a threaded shaft 46 in meshed engagement with the reduction gears 47 and the threaded follower 41, and the yoke means 40 which is pivotally attached to the follower 41 at 48, as shown in FIGS. 2–4. The motor 44 has separate directional windings and is free to rotate clockwise or counterclockwise thereby controlling the axial movement of the collar 23, upon actuation of the motor 44, whereby the shaft 50 of the motor 44 rotates the reduction gears 47 thereby causing the threaded shaft 46, mounted within the bearings 49, to rotate and the follower 41 to move vertically. The vertical movement of the follower 41 results in axial longitudinal movement of the collar 23 through means of the yoke 40.

Figure 6:
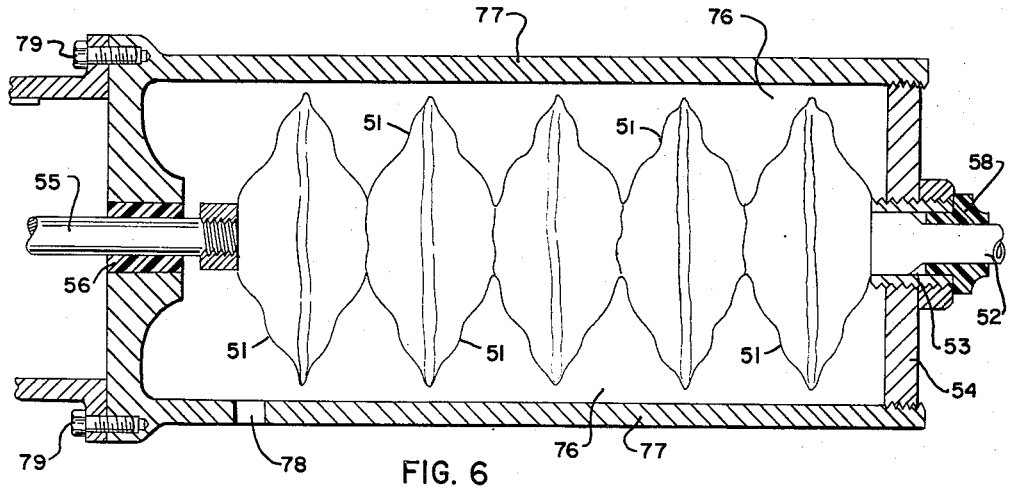
FIG. 6 is a longitudinal fragmentary sectional view of a portion of the pressure sensitive control means, and showing the bellows means which is mounted adjacent the intake manifold.
Figure 7:
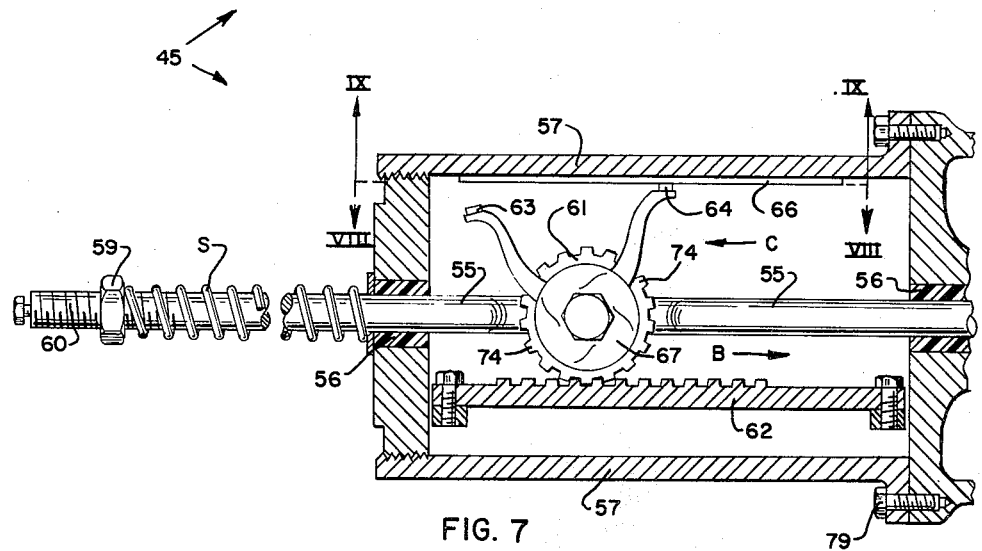
FIG. 7 is a longitudinal fragmentary sectional view of another portion of the pressure sensitive control means which is broken away in FIG. 6, and which includes the reversible motor control means.

The actuation of the reversible motor means 43 is controlled by the pressure sensitive control means, indicated generally at 45 in FIGS. 6 and 7, which is in communication with respect to a variable pressure chamber, such as the intake manifold, having an interior pressure correlated with engine loading requirements.

The variable volume chamber means cooperable for converting differential pressure into linear movement takes the form of metallic bellows means 51 in the particular example illustrated in FIG. 6. The bellows means 51 has a tube 52 at one end, in communication with the intake manifold through the opening 53 and the bearing-seal 58 in the base plate 54, and has a dielectric shaft 55 in threaded engagement at the opposite end.

The bellows means 51 must overcome the tension of the spring S, which may be adjusted, and is enclosed within the chamber 76 by the bellows housing 77 and the base plate 54. An opening 78 permits ambient atmosphere to enter the chamber 76 wherein the bellows 51 is housed. The housing 77 is threadingly engaged with the base plate 54 for subsequent ease of maintenance.

The shaft 55 slides within the seal-bearings 56 and extends through the contact housing 57 and has a tension spring S thereon. The spring S is adjustable by means of the nut 59 which is in threaded engagement with the threaded end 60 of the shaft 55. The contact housing 57 is removably attached with respect to the bellows housing 77 by means of the fasteners 79.

Figures 8, 9:
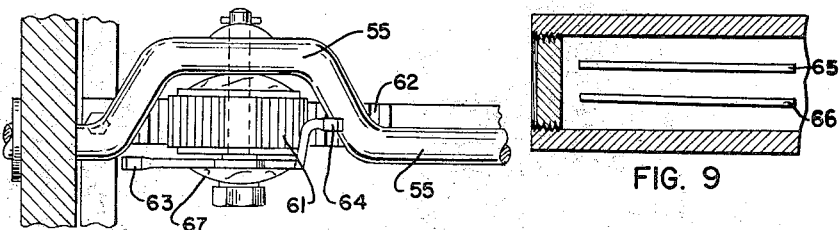
FIG. 8 is a fragmentary sectional view of the pressure sensitive control means taken along the lines VIII—VIII in FIG. 7.
FIG. 9 is a fragmentary sectional view taken along the lines IX—IX in FIG. 7.

Attached with respect to the shaft 55 is a pinion 61 which is in meshed engagement with the rack 62, as shown in FIG. 7. The pinion 61 is provided with two electrical contact points 63 and 64 which are cooperable for electrical engagement with the contact tracks 65 and 66 respectively, as shown in FIGS. 7–9. The tracks 65 and 66 are in electrical communication with separate directional windings of the motor 44. Thus, contraction or expansion of the bellows means 51 causes ensuing inward or outward longitudinal movement of the shaft 55 and corresponding directional rotation of the motor 44. As the shaft 55 and the gear 61 are actuated, in the direction indicated at B in FIG. 7, the point 63 and the track 65 are moved into electrical engagement; upon subsequent retrogressive movement the point 64 and the track 66 are moved into electrical engagement.

The contact arms 63 and 64 are positioned with respect to the gear 61 by means of the tension washer 67 and are appropriately grounded. The teeth 74 of the gear 61 are dielectric.

As the car is accelerated forwardly from a stationary position by opening the gas throttle (not shown), the bellows 51 will expand through loss of vacuum, causing the shaft 55 and the pinion 61 to move in the direction indicated by the arrow C in FIG. 7, and bringing the contact point 64 into electrical engagement with the track 66 thereby actuating the motor means 43 which in turn is cooperable with the toggle means 22 to move it and the radially adjustable driven vanes 21 toward the position shown in FIG. 4 to an extent such as to provide the required output torque, at which point the adjustment operation will cease.

Upon subsequent increase in revolutions per minute in the engine, the bellows 51 will start contracting and start the retrogressive movement in the direction indicated by the arrow B in FIG. 7 whereby the motor 44 will reverse its previous rotation and the follower 41 will start its upward ascent causing the vanes 21 to move toward the shaft 12 through the intermediate action of the toggle means 22 thereby decreasing the amount of torque delivered in exact accordance with the engine loading requirements.

The end plates 69A and 70A of the housing 68 which encloses the entire transmission 10 are adapted to be mounted between the corresponding mounting brackets 69 and 70, and with the input shaft 12 being coupled to the crankshaft 71, which is driven by the motor of the automobile, and with the output shaft 15 being adapted to be mounted within the output housing 72 and thence through the bearing 73 to effective coupling with respect to the rear wheels, as shown by the illustrative partly sectional and partly fragmentary automobile chassis F in FIG. 5.

It should be noted that while the present invention is preferably to be used in combination with an automobile, other applications are contemplated, and the invention is not to be so limited. For example, the present invention may be used in conjunction with trucks, tractors, marine engines or the like.

Numerous modifications and variations of the present invention will occur to those skilled in the art after a careful study hereof. All such properly within the basic spirit, scope and/or teachings of the present invention are intended to be included and comprehended herein as fully as if specifically described, illustrated and claimed.

For example, it is obvious that the pressure sensitive control means, the toggle means, and the reversible motor means may be modified substantially other than as specifically described and illustrated herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. An automatic transmission providing optimum control of torque and speed ratio in response to intake manifold pressure of an internal combustion engine, comprising: an internal combustion engine having an intake manifold; a driving rotary assembly coupled to said internal combustion engine and provided with fluid conduit means including intake openings and discharge openings, and driving vanes; a driven rotary assembly provided with driven vanes and toggle means operable for radial adjustment of said driven vanes; said toggle means including rotary and axially slidable collar means having link means in pivotal attachment with respect to said driven vanes, said collar means being effectively rotated by and slidable on said output shaft; pressure sensitive control means coupled to the intake manifold, said pressure sensitive control means including variable volume chamber means for converting differential pressure into linear movement, and reversible motor control means acting in response to said variable chamber means; reversible motor means mechanically attached to said toggle means and electrically connected to said motor control means.

2. An automatic transmission providing optimum control of torque and speed ratio in response to intake manifold pressure of an internal combustion engine, comprising: an internal combustion engine having an intake manifold; a driving rotary assembly coupled to said internal combustion engine and provided with fluid conduit means including intake openings and discharge openings, and driving vanes, said driving rotary assembly being attached to the input shaft of said transmission; a driven rotary assembly provided with driven vanes and toggle means operable for radial adjustment of said driven vanes, said driven rotary assembly being attached to the output shaft of said transmission, said driven rotary assembly including a separator plate, remotely opposed to said driving assembly, provided with vane slots wherein said driven vanes are slidably positioned; said toggle means including rotary and axially slidable collar means having link means in pivotal attachment with said driven vanes, said collar means being effectively rotated by and slidable on said output shaft; pressure sensitive control means coupled to the intake manifold, said pressure sensitive control means including variable volume chamber means for converting differential pressure into linear movement, and reversible motor control means acting in response to said variable chamber means; said reversible motor control means including an adjustable shaft attached to said variable volume chamber means, a rack and pinion arrangement coupled to said shaft, and electrical contact means; reversible motor means mechanically attached to said toggle means and electrically connected to said motor control means.

3. An automatic transmission providing optimum control of torque and speed ratio in response to intake manifold pressure of an internal combustion engine, comprising: an internal combustion engine having an intake manifold; a driving rotary assembly coupled to said internal combustion engine and provided with fluid conduit means including intake openings and discharge openings, and driving vanes, said driving rotary assembly being attached to the input shaft of said transmission; a driven rotary assembly provided with driven vanes and toggle means operable for radial adjustment of said driven vanes, said driven rotary assembly being attached to the output shaft of said transmission, said driven rotary assembly including a separator plate, remotely opposed to said driving assembly, provided with vane slots wherein said driven vanes are slidably positioned; said toggle means including rotary and axially slidable collar means having link means in pivotal attachment with said driven vanes, said collar means being effectively rotated by and slidable on said output shaft; pressure sensitive control means coupled to the intake manifold, said pressure sensitive control means including bellows means connected to the intake manifold, and electrically operable reversible motor control means coupled to said bellows means; reversible motor means mechanically attached to said toggle means and electrically connected to said motor control means, said reversible motor means including a shaft having a follower, operably attached therewith, and means connecting said follower and said toggle means.

4. An automatic transmission providing optimum control of torque and speed ratio in response to intake manifold pressure of an internal combustion engine, comprising: an internal combustion engine having an intake manifold; a driving rotary assembly coupled to said internal combustion engine and provided with fluid conduit means including intake openings and discharge openings, and driving vanes, said driving rotary assembly being attached to the input shaft of said transmission; a driven rotary assembly provided with driven vanes and toggle means operable for radial adjustment of said driven vanes, said driven rotary assembly being attached to the output shaft of said transmission, said driven rotary assembly including a separator plate, remotely opposed to said driving assembly, provided with vane slots wherein said driven vanes are slidably positioned, and a vane housing enclosing said driving and driven vanes; said toggle means including rotary and axially slidable collar means having link means communicating through said vane housing in pivotal attachment with said driven vanes, said collar means being effectively rotated by and slidable on said output shaft; pressure sensitive control means coupled to the intake manifold, said pressure sensitive control means including bellows means connected to the intake manifold, and electrically operable reversible motor control means coupled to said bellows means; said reversible motor control means including a spring biased insulated shaft, attached to said bellows means, a pinion having a duplex of contact points projecting therefrom, a rack in meshed engagement with said pinion, and two electrical contact points; reversible motor means mechanically attached to said toggle means and electrically connected to said motor control means, said reversible motor means including a shaft having a follower, operably attached therewith, and means connecting said follower and said toggle means.

5. An automatic transmission providing optimum control of torque and speed ratio in response to intake manifold pressure of an internal combustion engine, comprising: an internal combustion engine having an intake manifold; a driving rotary assembly coupled to said internal combustion engine and provided with fluid conduit means including intake openings and discharge openings, and driving vanes, said driving rotary assembly being attached to the input shaft of said transmission; a driven rotary assembly provided with driven vanes and toggle means operable for radial adjustment of said driven vanes, said driven rotary assembly being attached to the output shaft of said transmission, said driven rotary assembly including a separator plate, remotely opposed to said driving assembly, provided with vane slots wherein said driven vanes are slidably positioned, and a vane housing enclosing said driving and driven vanes; said toggle means including rotary and axially slidable collar means having link means communicating through said vane housing in pivotal attachment with said driven vanes, said collar means being effectively rotated by and slidable on said output shaft; pressure sensitive control means coupled to the intake manifold, said pressure sensitive control means including bellows means connected to the intake manifold, and electrically operable reversible motor control means coupled to said bellows means; said reversible motor control means including a spring biased insulated shaft, attached to said bellows means, a pinion having a duplex of contact points projecting therefrom, a rack in meshed engagement with said pinion, and two electrical contact points; reversible motor means mechanically attached to said toggle means and electrically connected to said motor control means, said reversible motor means including a threaded shaft having a threaded follower operably attached therewith and yoke means connecting said follower and said collar of said toggle means; said contact points electrically connected to separate directional windings of said reversible motor means; a transmission housing enclosing said driven and said driving rotary assembly.

References Cited in the file of this patent
UNITED STATES PATENTS

| | | |
|---|---|---|
| 1,160,922 | MacPherson | Nov. 16, 1915 |
| 2,270,545 | Neracher et al. | Jan. 20, 1942 |
| 2,323,926 | McGill | July 13, 1943 |
| 2,344,594 | Bryant | Mar. 21, 1944 |
| 2,354,987 | Fawkes | Aug. 1, 1944 |
| 2,393,882 | Blair | Jan. 29, 1946 |
| 2,515,498 | De Craene et al. | July 18, 1950 |
| 2,556,666 | Snyder | June 12, 1951 |
| 2,851,959 | Kangas | Sept. 16, 1958 |